United States Patent
Bates et al.

(10) Patent No.: US 8,327,336 B2
(45) Date of Patent: Dec. 4, 2012

(54) ENHANCED THREAD STEPPING

(75) Inventors: Cary L. Bates, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 931 days.

(21) Appl. No.: 12/406,627

(22) Filed: Mar. 18, 2009

(65) Prior Publication Data
US 2010/0242026 A1 Sep. 23, 2010

(51) Int. Cl.
G06F 9/44 (2006.01)
(52) U.S. Cl. .......................... 717/128; 717/124; 717/127
(58) Field of Classification Search .................. None
See application file for complete search history.

(56) References Cited

U.S. PATENT DOCUMENTS

| | | | |
|---|---|---|---|
| 6,378,124 B1 | 4/2002 | Bates | |
| 6,378,125 B1 | 4/2002 | Bates | |
| 6,826,754 B1* | 11/2004 | Miller | 718/104 |
| 6,971,084 B2* | 11/2005 | Grey et al. | 717/127 |
| 7,111,307 B1* | 9/2006 | Wang | 717/128 |
| 7,178,005 B1* | 2/2007 | Jordan et al. | 711/217 |
| 7,219,348 B2* | 5/2007 | Tudor | 718/107 |
| 7,421,681 B2* | 9/2008 | DeWitt et al. | 717/128 |
| 7,428,727 B2* | 9/2008 | Alverson et al. | 717/134 |
| 7,752,605 B2* | 7/2010 | Qadeer et al. | 717/127 |
| 7,779,390 B1* | 8/2010 | Allavarpu et al. | 717/124 |
| 7,849,465 B2* | 12/2010 | Zou et al. | 718/104 |
| 7,865,883 B1* | 1/2011 | Sistare et al. | 717/128 |
| 8,042,102 B2* | 10/2011 | DeWitt et al. | 717/128 |
| 2005/0149697 A1* | 7/2005 | Enright et al. | 712/214 |
| 2007/0271450 A1* | 11/2007 | Doshi et al. | 712/245 |
| 2007/0288939 A1* | 12/2007 | Stall | 719/328 |
| 2008/0127035 A1* | 5/2008 | Lev et al. | 717/100 |
| 2008/0271042 A1* | 10/2008 | Musuvathi et al. | 718/108 |
| 2008/0282229 A1* | 11/2008 | Kim et al. | 717/124 |
| 2009/0125887 A1* | 5/2009 | Kahlon et al. | 717/128 |
| 2009/0164976 A1* | 6/2009 | Gritter et al. | 717/127 |
| 2009/0320001 A1* | 12/2009 | Bates et al. | 717/129 |
| 2011/0252424 A1* | 10/2011 | Shen et al. | 718/100 |
| 2011/0258421 A1* | 10/2011 | Elnozahy et al. | 712/227 |

OTHER PUBLICATIONS

Shameem Akhter, "Multithreaded Debugging Techniques", Apr. 23, 2007, excerpted from "Multi-Core Programming", Intel Corporation, pp. 1-10; <http://www.drdobbs.com/cpp/multithreaded-debugging-techniques/199200938>.*

Agarwal et al., "Runtime Detection of Potential Deadlocks for Programs with Locks, Semaphores, and Condition Variables", 2006 ACM, pp. 51-59; <http://dl.acm.org/citation.cfm?id=1147403.1147413&coll=DL&dl=GUIDE&CFID=97596523&CFTOKEN=81085112>.*

Li et al., "MKtrace—An innovative debugging tool for multi-threaded programs on multiprocessor systems", 2007 IEEE, pp. 510-517; <http://ieeexplore.ieee.org/stamp/stamp.jsp?tp=&arnumber=4425894>.*

* cited by examiner

Primary Examiner — Thuy Dao
Assistant Examiner — Ben C Wang
(74) Attorney, Agent, or Firm — Patterson & Sheridan LLP

(57) ABSTRACT

Embodiments of the invention provide debugging techniques for multithreaded programs. For example, a debugger may reduce the time required to release inactive threads that hold resources needed by an active thread. For example, if a timer expires before a line of code finishes executing, the debugger assumes that the active thread requires a resource locked by an inactive thread and releases other threads. During subsequent execution of the line of code, the debugger reduces the timer length of the timer. In doing so, inactive threads are released sooner, thereby reducing the wait time a user experiences when debugging lines of code.

20 Claims, 4 Drawing Sheets

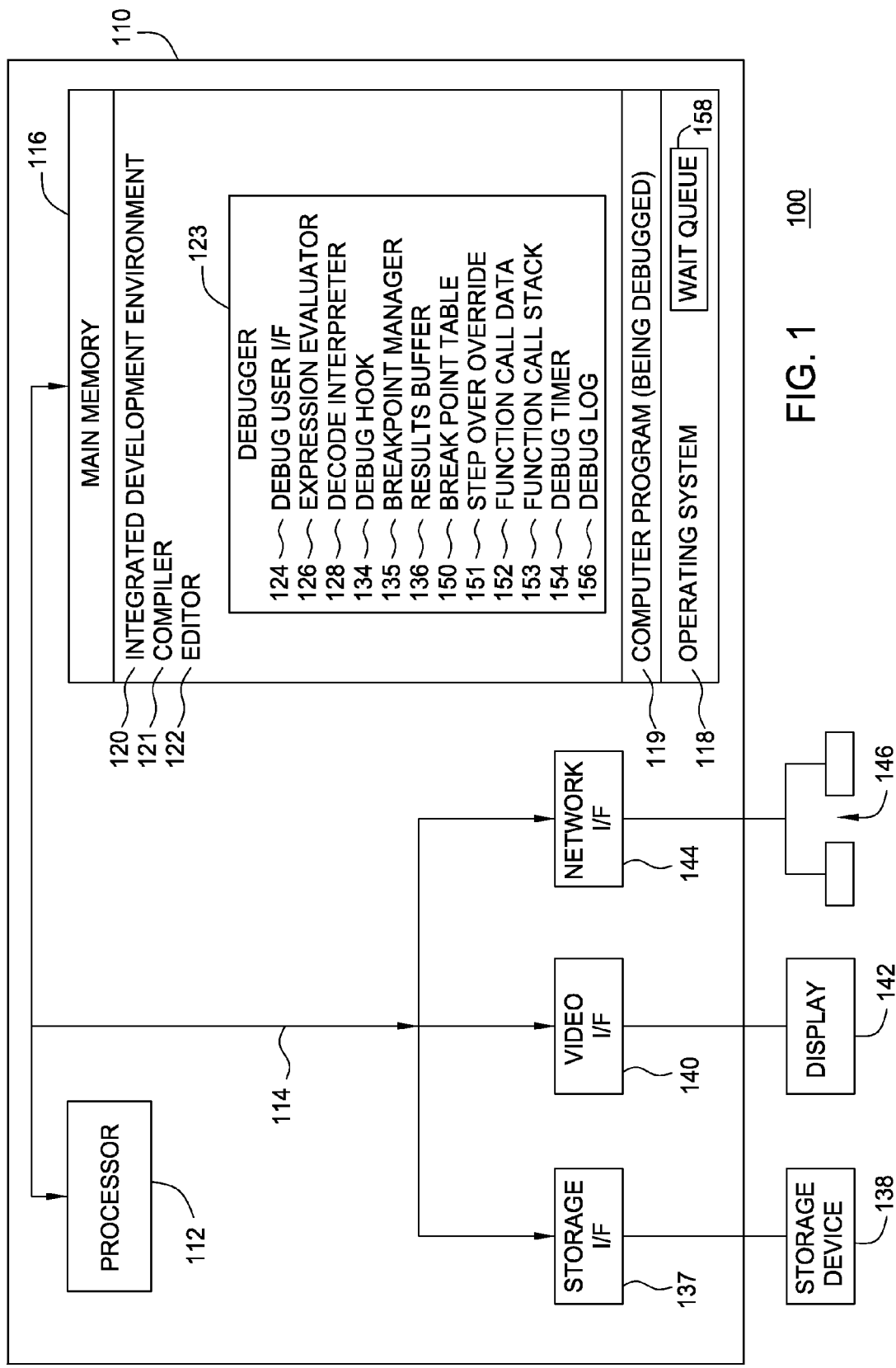

200

```
SYSTEM DEBUGGER                                                    _ 🗗 ×
FILE  EDIT  WINDOWS  DEBUG   BREAKPOINTS   HELP
 ▷  ◯  ┣  ┣   1   #include <pthread.h>
              2   #include <stdio.h>
              3   #include <stdio.h>
210   213     4
   211        5   /* prototype for thread function */
     212      6   void *mythread (void *data);
              7
              8   /* initialize mutex (which is shared between all threads) */
              9   pthread_mutex_t count_mutex = PTHREAD_MUTEX_INTIALIZER;
             10
             11   int x=0;
             12
             13   int main(void) {
             14
             15         /* Array for holding thread ID's for each thread */
             16         pthread_t tids[10];
             17         int i;
             18
             19         /* Create 10 threads. Each thread will increment x until x is 4000.*/
             20         for (i=0; i< 10; i++) {
         ➤   21                 pthread_create (&tids[i], NULL, mythread, NULL);
             22         }
             23
             24         /* Wait for each thread to finish before terminating */
             25         for (i=0; i< 10; i++) {
  204        26                 pthread_join(tids[i], NULL);
             27                 printf("Thread id %ld returned\n",tids[i]);
             28         }
             29   return ( 1 );
             30   }
             31
             32   /* Thread function */
             33   void *mythread (void *data) {
             34         while(x < 4000) {
             35
             36                 /* Try locking the mutex. If another thread already has it locked,
             37                  * the code is blocked until the mutex is available. */
             38                 pthread_mutex_lock(&count_mutex);
             39                 x++;
             40
             41                 /* Print out the thread ID and the value of X */
             42                 printf("Thread ID%ld: X is now %d.\n",pthread_self( ),x);
             43
             44                 /* Release the mutex so that another thread can try to lock it */
             45                 pthread_mutex_unlock(&count_mutex);
             46         }
             47         pthread_exit(NULL);
             48   }
```

ENHANCED THREAD STEPPING

BACKGROUND OF THE INVENTION

1. Field of the Invention

The present invention generally relates to software development. More particularly, the invention is directed to techniques for debugging the source code of multithreaded computer programs.

2. Description of the Related Art

A programmer usually develops a software program using a text editor to create source code files. From these source code files, an executable program is generated by translating the source code files into an executable program. The process of generating the executable program from the source code usually involves the use of several software programs. For example, a compiler program may be used to generate a set of object code modules from the source code file, and a linker may be used to link the modules together to form the executable program.

It is not uncommon for the source code files of a computer program to include thousands, if not millions, of lines of source code, often spread across many files. Because of this complexity, software programs often contain errors that manifest themselves during program execution (commonly referred to as bugs). Accordingly, a debugging tool has become an essential tool of software development. Typically, a debugger program allows a developer to monitor the execution of a computer program. Doing so assists a programmer in finding and correcting errors. A typical debugging system includes a combination of computer hardware and debugger software that executes the program being debugged in a controlled manner. For example, a user interface provided for the debugger typically allows a user to set breakpoints at lines of code. During program execution, when the executing program encounters a breakpoint, the program ceases executing and turns control over to the debugger, allowing the developer to examine the state of the program at the breakpoint.

Additionally, debuggers often provide a variety of other debugging commands that allow a user to control the execution of a program. For example, one common debugger command allows a user to "step" through lines of source code, executing the program line-by-line. When a user issues a step command, the program executes the machine instructions corresponding to the line of source code based on the current execution point of the program, and advances the execution point to the next line of source code. Step commands typically take one of two forms: step into and step over. A step over command causes the program to execute the current line of code and set the execution point of the program to the next line of source code. If the line of code contains a function call (i.e., it invokes a routine or method defined by the program), then the program executes all of the instructions specified by the function. In contrast, the step into command will set the execution point of the program to the first line of code for the function, allowing a programmer to step through each of the instructions specified by the function.

Multithreading is a programming model that allows multiple threads to exist within the context of a single process, sharing the process' resources but able to execute independently. The threaded programming model provides developers with a useful abstraction of concurrent execution.

This advantage allows multithreaded programs to operate faster on computer systems that have multiple central processing units (CPUs), multiple cores, or across a cluster of machines. This is because the threads of the program naturally lend themselves to truly concurrent execution. In such a case, the programmer needs to be careful to avoid race conditions, and other non-intuitive behaviors. In order for data to be manipulated correctly, threads often need to rendezvous in time in order to process the data in the correct order. Threads may also require atomic operations (often implemented using locking mechanisms such as semaphores, mutexes, or the like) to prevent common data from being simultaneously modified, or read while in the process of being modified.

SUMMARY OF THE INVENTION

One embodiment of the invention provides a computer implemented method for debugging a multithreaded program. The method generally includes receiving a first request to execute a current line of code for a first thread of the multithread program actively being debugged, wherein executing the current line of code requires access, by the first thread, to a shared resource shared by a plurality of threads of the multithreaded program, initiating a debug timer with a first predetermined time limit, and upon determining that the debug timer expires before the current line of code in the first thread is executed by the debugger, recording an indication that the debug timer expired for the first thread while waiting for access to the shared resource, and reducing the amount of time reflected by the first predetermined time limit.

Another embodiment of the invention provides a computer implemented method for debugging a multithreaded program. The method generally includes receiving a first request to execute a current line of code for a first thread of the multithread program actively being debugged, wherein executing the current line of code requires access, by the first thread, to a shared resource shared by a plurality of threads of the multithreaded program, prior to the executing the current line of code, receiving a message that a second thread has exclusive access to the shared resource, wherein the second thread is suspended from being scheduled for execution as a result of the first thread actively being debugged, releasing at least the second thread for execution, executing the second thread at least until the shared resource is freed by the second thread, accessing, by the first thread being actively debugged, the shared resource, and subsequently, executing the line of code for the first thread.

Yet another embodiment of the invention provides a computer readable storage medium containing a program, which, when executed performs an operation for debugging a multithreaded program. The operation generally includes receiving a first request to execute a current line of code for a first thread of the multithread program actively being debugged, wherein executing the current line of code requires access, by the first thread, to a shared resource shared by a plurality of threads of the multithreaded program, initiating a debug timer with a first predetermined time limit, and upon determining that the debug timer expires before the current line of code in the first thread is executed by the debugger, recording an indication that the debug timer expired for the first thread while waiting for access to the shared resource, and reducing the amount of time reflected by the first predetermined time limit.

Yet another embodiment of the invention provides a system. The system generally includes a processor, and a memory containing a debugging program, which when executed by the processor performs an operation for debugging a multithreaded program. The operation generally includes receiving a first request to execute a current line of code for a first thread of the multithread program actively being debugged, wherein executing the current line of code requires access, by the first thread, to a shared resource shared by a plurality of threads of the multithreaded program, initiating a debug timer with a first predetermined time limit, and upon determining that the debug timer expires before the current line of code in the first thread is executed by the debugger, recording an indication that the debug timer expired for the first thread while waiting for access to the shared resource, reducing the amount of time reflected by the first predetermined time limit, and releasing at least a second thread, of the plurality, for execution wherein the second thread has exclusive access to the shared resource.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a functional block diagram illustrating a network environment including at least one computer configured for debugging the source code of a computer program, according to one embodiment of the invention.

FIG. 2 illustrates a graphical user interface for a debugger program, according to one embodiment of the invention.

DETAILED DESCRIPTION OF THE PREFERRED EMBODIMENTS

Figure 3:
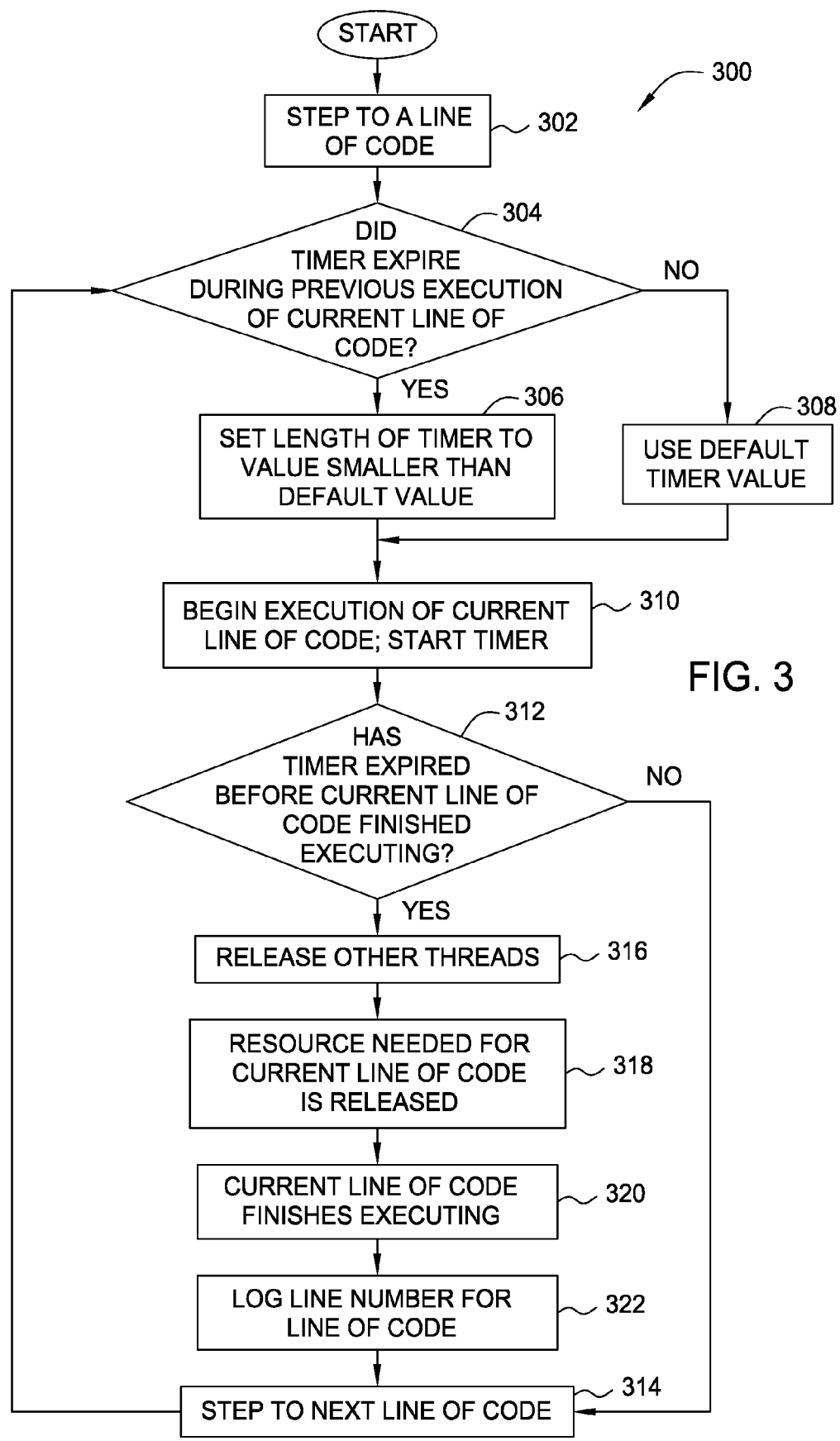
FIG. 3 is a flowchart illustrating a method for debugging a multithreaded program, according to one embodiment of the invention.

Embodiments of the invention provide enhanced debugging techniques for multithreaded programs. When debugging a multi-threaded program, a debugger may stop all threads that are executing when a breakpoint is hit. As the user steps through lines of source code, it may appear that the debugger keeps executing in the same thread while stepping, but this may not be the case. Keeping the execution in the same thread, and not allowing other threads to run, can easily produce a dead lock when the user stepping through a thread encounters a resource guarded by another thread (e.g. by a semaphore, a mutex, or the like). As a result, the debugger hangs while waiting for a resource that will never be released (as the resource holding thread has been halted by operation of the debugger).

To solve this problem, debuggers may initially execute only code from the thread in which the breakpoint occurred. After a predetermined time limit, however, a debugger releases other threads—allowing their execution to continue outside of the debugger. Thus, the debugger gives the current thread an opportunity to finish executing the line of code before releasing other threads.

Generally, the predetermined time limit is rather large (usually around the magnitude of a few seconds). Thus, if a user is stepping through source code and encounters a blocking condition, the debugger will hang for at least a couple of seconds until the predetermined time limit is reached. Once met, the debugger releases the other threads, the resource needed by the current thread may be released, and the current thread continues executing.

Releasing the other threads does expose the user to other debug events such as breakpoints being hit in other threads. This may cause the user to end up stopped in a different thread. Also, running other threads may disrupt the environment the user was hoping to maintain (e.g., allowing another thread to run may result in a program crash). So a long initial wait time is desirable as it allows users to step over a rather long running routine (e.g., one that does a significant amount of processing, but does not result in a dead lock) without allowing the other threads to be run. At the same time the wait can be annoying when a semaphore is encountered and the user is waiting needlessly for the other threads to be released and the deadlock to be resolved.

In addition to the annoyance caused by this delay, problems occur when the user is stepping along, experiences one of these delays, and then presses the step button again. This may cause multiple queued up "step" statements to execute when the semaphore (or other lock) is finally released. This can move a developer past the statement at which they were expecting to stop.

In one embodiment, a debugger may reduce the time required to release inactive threads that hold resources needed by an active thread. For example, when stepping to a line of code, the debugger may begin executing the line of code and also initiate a debug timer. If the debug timer expires before the line of code is executed, the debugger assumes that the active thread requires a resource that is locked by an inactive thread and begins to release other threads. Also, the debugger may note whether a given timer expired (indicating that the thread was deadlocked for a period waiting for resources held by another thread to be released). During a subsequent execution of the line of code, the debugger determines whether the debug timer expired during a previous execution of the line of code. If so, the debugger reduces the timer length of the debug timer. In doing so, inactive threads holding resources needed for an active thread may be released earlier, thereby reducing the wait time a user experiences when debugging lines of code that require access to a locked resource locked by another thread.

Alternatively, instead of reducing the length of the debug timer, the debug timer may be interrupted by an event sent by the operating system. The event may indicate that the active thread is waiting for a resource locked by an inactive thread. In doing so, the other threads may immediately be released upon interruption of the debug timer rather than waiting for the debug timer to fully expire.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a computing environment that includes at least one computer configured for debugging the source code of a computer program, according to one embodiment of the invention. As illustrated, the computing environment 100 includes a computer system 110 and a plurality of networked devices 146. For simplicity, only the details of the computer system 110 are shown. In one embodiment, the components provided by environment 100 include computer software applications executing on existing computer systems, e.g., desktop computers, server computers, laptop computers, tablet computers, and the like. The debugging system described herein, however, is not limited to any currently existing computing environment, and may be adapted to take advantage of new computing systems as they become available. Further, although shown networked into a larger system, the computer system 110 may be a standalone device. Embodiments may also be adapted to a distributed computing environment in which tasks are performed by remote processing devices that are linked through a communications network.

Illustratively, the computer system 110 is shown including a storage interface 137 connected to storage device 138, a video interface 140 connected to a display 142, and a network interface 144 connected to computer network 146. The display 142 may be any video output device configured to display visual images to a user of the debugging system disclosed herein. Computer system 110 is shown with at least one processor 112, which obtains instructions and data via a bus 114 from a main memory 116.

The main memory 116 provides a sufficiently large storage area to store programs and data structures. Main memory 116 could be one or a combination of memory devices, including Random Access Memory, nonvolatile or backup memory, (e.g., programmable or flash memories, read-only memories, etc.). In addition, memory 116 may include memory physically located elsewhere in a computer system 110. For example, memory may include any storage capacity used as virtual memory or stored on a mass storage device or on another computer coupled to the computer system 110 via bus 114.

As shown, the main memory 116 generally includes an operating system 118, a computer program 119 and an Integrated Development Environment (IDE) 120. In one embodiment, the operating system 118 may include a wait queue 158, which may be used to monitor threads waiting for a locked resource. The wait queue 158 is described in further detail below in FIG. 3.

The computer program 119 represents the program being debugged using IDE 120. Accordingly, the computer 119 may include both the source code for computer program 119, and a machine-readable version of the code executed by processor 112. Illustratively, the IDE 120 includes a compiler 121, an editor 122 and a debugger program (sometimes referred to as "the debugger") 123. More generally, the IDE 120 provides a combination of software programs, data structures, and any associated utilities for editing, compiling and locating, analyzing and correcting errors in the source code of the computer program 119.

Further, although the software elements illustrated in FIG. 1, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In various embodiments, the debugger 123 may include a number of components. Illustratively, debugger 123 includes a debugger user interface 124, expression evaluator 126, debug interpreter 128, debugger hook (also known as a stop or breakpoint handler) 134, a breakpoint manager 135, a results buffer 136, a breakpoint table 150, a step into data table 151, a function call data table 152, and a function call stack 153. Although treated herein as integral components of the debugger 123, one or more of the foregoing components may exist separately in the computer system 110. As shown, the debugger may also include a debug timer 154 and a debug log 156, which are described in further detail below. Further, the debugger 123 may include additional components not shown.

In one embodiment, a user initiates the debugging process by interacting with the user interface 124. The user interface 124 may display source code of the program being debugged and highlight the current execution point of the program 119, relative to the source code. In addition, the interface 124 may display information about other locations within the source code, e.g., breakpoints, step point overrides, or other or other information used to convey the state of the program during a debugging session. The user interface 124 may be configured to allow a user to set control points (e.g., breakpoints, watch points, and alternate step points), display and change values in memory for variables of the program 119, and activate and control other features described herein.

After initiating a debugging session, a user may cause debugger 123 to begin executing program 119. During execution, when a breakpoint is encountered, control is returned to the debugger 123 via the debug hook 134. The debug hook 134 includes instructions returning control to the debugger 123. In one embodiment, the debug hook 134 may be configured to invoke the debug user interface 124 and may pass information about the execution state of program 119 to the interface 124. Alternatively, information may be passed to the results buffer 136 to cache data for the user interface 124. While the debugger has control, a user may issue individual step commands (e.g., step into, and step over), to execute the computer program, one line of code at a time. Additionally, the user may input commands to run a desired debugging routine, inspect the state of data associated with the program being debugged, or perform other debugging actions.

FIG. 2 illustrates an exemplary graphical user interface (GUI) 200, according to one embodiment of the invention. The GUI 200 is illustrative of the debug user interface 124, and may be rendered on an output device such as the display 142. In one embodiment, the GUI 200 includes a viewable screen area 202 that displays the source code of the computer program 119 being debugged. Illustratively, the computer program 119 is a multi-threaded program. The program 119 creates ten threads (e.g. line numbers 19-22) that each increment a global variable 'x' until x reaches the value of 4000. To ensure that only one thread increments 'x' at a time, each thread obtains a lock (e.g. a semaphore, a mutex, or the like), before incrementing 'x'. Once a thread is finishing incrementing 'x', the thread releases the lock, thereby allowing other threads to obtain a lock and increment 'x'.

As shown, the debugger 123 may format the source code in a variety of ways to convey meaningful information to a user viewing the source code (e.g., indentations, source code highlighting etc.). Additionally, FIG. 2 illustrates an arrow 204 next to line 21 of the source code. The arrow 204 indicates the current execution point of the program 119. Thus, in this example, the program 119 has executed lines 1-20 and line 21 will be the next line of the program 119 executed.

In one embodiment, the GUI 200 includes control elements for issuing debugger commands (e.g., step into and step over commands) and may further include elements for setting watch points, breakpoints, step point overrides, etc. As illustrated, the interface 200 includes four buttons, a start button 210, stop button 211, a step into button 212 and a step over button 213. The start button 210 may be used to resume execution of the program from the current execution point indicated by the arrow 204. The stop button 211 may be used to stop or interrupt the execution of the program 119.

Illustratively, the step into button 212 allows a user to issue a step into command, and step over button 213 allows the user to issue a step over command. As described above, a step into command instructs the debugger to execute the next line of source code, but to step into the first function call (if any) present in the line of source code. In contrast, the step over command instructs the debugger to execute the current line of source code, including any function calls, and pause execution at the next sequential line of source code.

For example, the execution point of the program 119 illustrated in FIG. 2 is currently stopped at line 21. This line includes a function call executed ten times inside a for loop, creating 10 threads. Each thread is created with a parameter of the function mythread( ). Thus, the program spawns 10 threads, which each begin executing a copy of the mythread( ) function. In turn, each thread running the mythread( ) function attempts to lock a mutex, and upon doing so increments the value of the shared variable "x" (until "x" reaches 4000). Thus, the ten threads simply compete for the mutex until "x" reaches 4000. Depending on whether a "step over" or "step into" command is issued, the debugger 123 performs the following actions: a step into command "steps into" the mythread( ) function and sets the execution point of the program to the first line of the mythread( ) function (line 34) (for whichever of the ten threads is being created). Alternatively, a "step over" command causes the debugger 123 to execute the mythread( ) function (creating one of the 10 threads) and to return the execution point to line 20, the next line to be executed following the call to pthread_create( ).

As stated, a single thread may be active at a time during debugging. Thus, when a user stepping through a thread encounters a resource guarded by another thread, a dead lock situation may occur because the thread holding the resource is stopped (i.e., the resource-holding thread will not be scheduled for execution). To prevent this dead lock, the debugger 123, may start releasing other threads (allowing them to be scheduled for execution) after a predetermined time limit. When the debugger 123 releases the thread that is holding the resource, the resource can be released and the current thread can continue executing.

The debugger 123 may use the debug timer 154 to determine when the predetermined time limit expires. For example, the debug timer 154 may be initiated when the debugger 123 issues a command to "step into" or "step over" a line of an active thread. If the command being stepped into or stepped over does not complete before the debug timer 154 expires (i.e. the predetermined time limit is reached), the debugger 123 assumes that an inactive thread is holding a resource that is needed for the current thread to continue and releases other threads.

In one embodiment, the debugger 123 may reduce the predetermined time limit of the debug timer 154 for subsequent "stepping" operations for those lines of code that previously resulted in expiration of the debug timer 154. In doing so, inactive threads holding resources needed for an active thread may be released sooner, thereby reducing the wait time a user experiences when debugging lines of code that require a locked resource. Actions relating to reducing the predetermined time limit of a debug timer 154 are shown in FIG. 3.

FIG. 3 is a flowchart illustrating a method 300 for debugging a multithreaded program, according to one embodiment of the invention. As shown, the method 300 beings at step 302, where the debugger 123 steps to a line of code of a computer program 119 (upon issuance of a "step" command).

At step 304, the debugger 123 determines if the debug timer 154 expired during a previous execution of this line of code. For example, the debugger 123 may read a debug log 156 which stores a record of the lines of code resulting in the debug timer 154 expiring. If it is determined that the debug timer 154 previously expired on the current line of code, at step 306, the time limit for the debug timer 154 may be reduced. Otherwise, if the debug timer 154 did not previously expire on the current line of code, at step 308, a default time limit is used for the debug timer 154.

In either case, at step 310, the current line of code is executed, and the debug timer 154 is initiated using the time limit determined above. At step 312, the debugger 123 may determine if the debug timer 154 has expired before the current line of code is executed. If the current line of code finished executing before the debug timer 154 expired, at step 314, the debugger 123 steps to the next line of code of the program 119. However, if the debug timer 154 expired before the current line of code finished executing, then the debugger 123 may assume that the current line of code requires a resource that is locked by an inactive thread to finish execution. As a result, at step 316, the debugger 123 may begin releasing other threads of the program 119.

As an example, with reference to FIG. 2, suppose that one of the ten threads actively being debugged and executing at line 38. At this line of code, the active thread attempts to lock a mutex (the call to pthread_mutex_lock( )). If the mutex is already locked (in this example, by one of the other ten threads), the active thread blocks until the mutex becomes available. In such a case, the active thread (executing in the debugger) is unable to lock the mutex until the inactive thread releases the lock. However, because the operation of the debugger has suspended all executing threads (save for a current one), the inactive thread will not be scheduled for execution. This deadlock goes on indefinitely. To address this issue, the debug timer 154 eventually expires because the current line of code cannot execute until the mutex is unlocked, and the debugger 123 begins releasing the other threads as a result.

Referring back to FIG. 3, after the debugger 123 begins releasing other threads, the resource needed for the current line of code is eventually released (step 318). In the present example, an inactive thread (i.e., not the thread actively being debugged) is scheduled for execution and eventually releases its lock on the mutex. As a result, at step 320, the current line of code may continue executing inside the debugger. For example, with reference to FIG. 2, if the current line of code is line 38, the mutex needed by this line may be unlocked by one of the other threads (released following the expiration of the debug timer 154), thereby allowing the thread being debugged to pass the call to pthread_mutex_lock on line 38.

At step 322, the debugger 123 may store a reference to line of code which blocked until after the debug timer expired in the debug log 156. In doing so, the next time the debugger 123 steps to this line of code, the debugger 123 may determine that the debug timer 154 expired during a previous execution. And in response, reduce the length of time needed before the debug timer 154 expires (steps 304-306). In one embodiment, the debug log 156 may be saved so that it may be used during subsequent debug sessions. In this case, the debug 154 log may be valid so as long as the source code is not modified. If the source code is modified, a new log may be created.

After the current line of code finishes executing and the line number for the current line of code is logged, the debugger 123 may step to the next line of code of the program at step 314.

In one embodiment, instead of reducing the length of the debug timer 154, the debug timer 154 may be interrupted. In this case, the other threads may be released (i.e., made available for scheduling) upon interruption of the debug timer 154. In one embodiment, the debug timer 154 may be interrupted by an event received by the operation system 118.

The event may indicate that the current line of code is waiting for a locked resource. As known in the art, an operating system 118 may include support for various locking mechanisms such as semaphores, mutexes, or the like. Such support may include a wait queue 158 that keeps track of the threads waiting for a locked resource. For example, when one thread obtains a lock on a resource, all other threads requesting access to the resource are placed in the wait queue 158. In one embodiment, whenever an active thread is placed in the wait queue 158, the operating system 118 may signal the event to the debugger 123. However, having such support may degrade system performance during normal run-time of the program. Therefore, in one embodiment, the user may be given an option to activate the operation system's 119 ability to monitor/report an event only during a debug session by using a particular compile-time option. Actions relating to interrupting the debug timer 154 are illustrated in FIG. 4.

Figure 4:
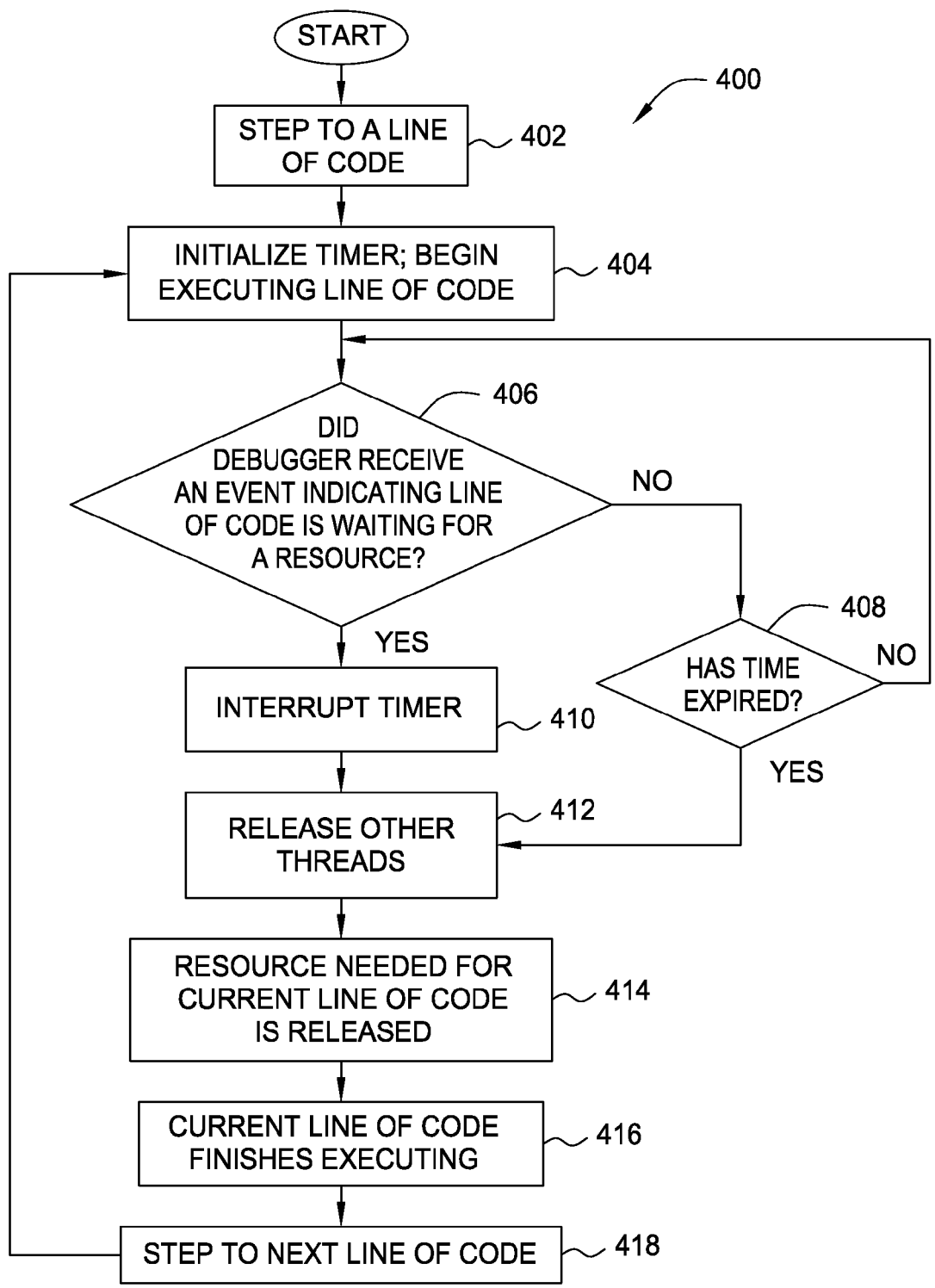
FIG. 4 is a flowchart illustrating a method for debugging a multithreaded program, according to another embodiment of the invention.

FIG. 4 is a flowchart illustrating a method 400 for debugging a multithreaded program, according to another embodiment of the invention. As shown, the method 400 beings at step 402, where the debugger 123 steps to a line of code of a computer program 119 (upon issuance of a "step into" command). At step 404, the debug timer 154 may be initiated and the current line of code begins execution. At step 406, the debugger 123 may determine if an event has been received indicating that the current line of code is waiting for a locked resource.

For example, referring to FIG. 2, suppose the current line of code is line 38, which is a command to try to lock a mutex. Further suppose that an inactive thread may already have the mutex locked. In this case, the operating system 118 may place the active thread in the wait queue 158 because it is waiting for the locked resource. In one embodiment, once the active thread is placed in the wait queue 158, the operating system 118 may signal an event to the debugger 123 indicating that the active thread is waiting for a locked resource.

Referring again to the deadlock example described above relative to the source code of FIG. 2, a thread actively being stepped through in the debugger may reach line 38, and attempt to lock the mutex. If available, the user may simply step over this line and continue stepping through the mythread( ) function. However, if the thread blocks (because anther one of the ten threads has already locked it), the thread actively being stepped through blocks until the mutex becomes available. As noted above, if the debugger has suspended all other threads from being scheduled for execution, this deadlock may go on indefinitely.

Referring back to FIG. 4, if at step 406, no event has been received the debugger 123, the method continues at step 408, where the debugger 123 may determines if the debug timer 154 has expired. If the debug timer 154 has not expired, the method returns to step 406. If however, an event has been received, the debug timer 154 is interrupted (at step 410) and the debugger 123 begins releasing other threads (at step 412) without waiting for the timer to actually expire. In such a case, the debugger is notified by the operating system that an active thread is waiting for a resource held by an inactive thread (i.e., one that will not be scheduled for execution by operation of the debugger program). As illustrated, the debugger 123 may also begin releasing other threads (at step 412) upon expiration of the debug timer (at step 408).

After the debugger 123 begins releasing other threads, the resource needed by the thread actively being debugged may be eventually released (step 414). As a result, at step 416, the current line of code may finish executing. For example, with reference to FIG. 2, if the current line of code is line 38, the mutex needed by the current line of code may be unlocked by one of the other threads, thereby allowing the thread actively being debugged to lock the mutex. After the current statement finishes executing, the debugger 123 may step to the next line of code of the program at step 418.

Advantageously, as described herein, embodiments of the invention allow for enhanced debugging techniques for multithreaded programs. In one embodiment, the debugger may reduce the time required to release inactive threads that hold resources needed by an active thread. For example, when stepping to a line of code, the debugger may begin execution of the line of code and also initiate a debug timer. If the debug timer expires before the line of code finishes executing, the debugger assumes that the active thread requires a resource that is locked by an inactive thread and begins to release other threads. During a subsequent execution of a line of code, the debugger determines if the debug timer expired during a previous execution of the line of code. If so, the debugger reduces the timer length of the debug timer. In doing so, inactive threads holding resources needed for an active thread may be released sooner, thereby reducing the wait time a user experiences when debugging lines of code that require a locked resource.

Alternatively, instead of reducing the length of the debug timer, the debug timer may be interrupted by an event sent by the operating system. The event may indicate that the active thread is waiting for a resource locked by an inactive thread. In doing so, the other threads may immediately be released upon interruption of the debug timer rather than waiting for the debug timer to fully expire.

While the foregoing is directed to embodiments of the present invention, other and further embodiments of the invention may be devised without departing from the basic scope thereof, and the scope thereof is determined by the claims that follow.

What is claimed is:

1. A computer implemented method for debugging a multithreaded program, comprising:
  receiving a first request to execute a current line of code for a first thread of the multithreaded program actively being debugged by a debugging application, wherein executing the current line of code requires access, by the first thread, to a shared resource shared by a plurality of threads of the multithreaded program, and wherein an execution of a second one of the plurality of threads is suspended by the debugging application;
  upon determining that a first debug timer did not expire during a previous execution of the current line of code, initiating a second debug timer for a predetermined time limit;
  upon determining that the first debug timer did expire during the previous execution of the current line of code, initiating the second debug timer for a reduced amount of time that is less than the predetermined time limit;
  initiating an execution of the current line of code by operation of one or more computer processors; and
  upon determining that the second debug timer has expired before the execution of the current line of code has completed:
    resuming the execution of the suspended second thread of the multithreaded program, and
    upon detecting that a lock on the shared resource has been released, completing the execution of the current line of code.

2. The method of claim 1, wherein the suspended second thread has exclusive access to the shared resource.

3. The method of claim 2, wherein resuming the execution of the suspended thread further comprises:
  executing the second thread at least until the second thread releases the lock on the shared resource.

4. The method of claim 1, further comprising:
  upon determining that the second debug timer has expired before the current line of code in the first thread is executed, initiating a third debug timer with the predetermined time limit during subsequent execution of the line of source code.

5. The method of claim 1, wherein the lock on the shared resource is a mutex lock engaged by one of the plurality of threads.

6. The method of claim 1, wherein the plurality of threads are suspended from being scheduled for execution as a result of the first thread actively being debugged.

7. The method of claim 1, further comprising:
  upon determining that the second debug timer has expired before the execution of the current line of code has completed, recording an indication that the second debug timer expired for the first thread while waiting for access to the shared resource.

8. A non-transitory computer readable medium containing a program, which, when executed performs an operation for debugging a multithreaded program, the operation comprising:
  receiving a first request to execute a current line of code for a first thread of the multithreaded program actively being debugged by a debugging application, wherein executing the current line of code requires access, by the first thread, to a shared resource shared by a plurality of threads of the multithreaded program, and wherein an execution of a second one of the plurality of threads is suspended by the debugging application;
  upon determining that a first debug timer did not expire during a previous execution of the current line of code, initiating a second debug timer for a predetermined time limit;
  upon determining that the first debug timer did expire during the previous execution of the current line of code, initiating the second debug timer for a reduced amount of time that is less than the predetermined time limit;
  initiating an execution of the current line of code; and
  upon determining that the second debug timer has expired before the execution of the current line of code has completed:
    resuming the execution of the suspended second thread of the multithreaded program, and
    upon detecting that a lock on the shared resource has been released, completing the execution of the current line of code.

9. The non-transitory computer readable medium of claim 8, wherein the suspended second thread has exclusive access to the shared resource.

10. The non-transitory computer readable medium of claim 9, wherein resuming the execution of the suspended thread further comprises:
  executing the second thread at least until the second thread releases the lock on the shared resource.

11. The non-transitory computer readable medium of claim 8, wherein the operation further comprises:
  upon determining that the second debug timer has expired before the current line of code in the first thread is executed, initiating a third debug timer with the predetermined time limit during subsequent execution of the line of source code.

12. The non-transitory computer readable medium of claim 8, wherein the lock on the shared resource is a mutex lock engaged by one of the plurality of threads.

13. The non-transitory computer readable medium of claim 8, wherein the plurality of threads are suspended from scheduling for executing as a result of the first thread actively being debugged.

14. The non-transitory computer readable medium of claim 8, further comprising:
  upon determining that the second debug timer has expired before the execution of the current line of code has completed, recording an indication that the second debug timer expired for the first thread while waiting for access to the shared resource.

15. A system, comprising:
a processor; and
a memory containing a debugging program which, when executed by the processor, performs an operation for debugging a multithreaded program, the operation comprising:
  receiving a first request to execute a current line of code for a first thread of the multithreaded program actively being debugged by a debugging application, wherein executing the current line of code requires access, by the first thread, to a shared resource shared by a plurality of threads of the multithreaded program, and wherein an execution of a second one of the plurality of threads is suspended by the debugging application;
  upon determining that a first debug timer did not expire during a previous
execution of the current line of code, initiating a second debug timer for a predetermined time limit;
  upon determining that the first debug timer did expire during the previous execution of the current line of code, initiating the second debug timer for a reduced amount of time that is less than the predetermined time limit;
  initiating an execution of the current line of code; and
  upon determining that the second debug timer has expired before the execution of the current line of code has completed:
    resuming the execution of the suspended second thread of the multithreaded program, and
    upon detecting that a lock on the shared resource has been released, completing the execution of the current line of code.

16. The system of claim 15, wherein resuming the execution of the suspended thread further comprises:
  executing the second thread at least until the second thread releases the lock on the shared resource.

17. The system of claim 15, wherein the operation further comprises:
  upon determining that the second debug timer has expired before the current line of code in the first thread is executed, initiating a third debug timer with the predetermined time limit during subsequent execution of the line of source code.

18. The system of claim 15, wherein the plurality of threads are suspended from scheduling for executing as a result of the first thread actively being debugged.

19. The system of claim 15, further comprising:
  upon determining that the second debug timer has expired before the execution of the current line of code has completed, recording an indication that the second debug timer expired for the first thread while waiting for access to the shared resource.

20. A computer implemented method for debugging a multithreaded program, comprising:
  receiving a first request to execute a current line of code for a first thread of the multithreaded program actively being debugged by a debugging application, wherein executing the current line of code requires access, by the first thread, to a shared resource shared by a plurality of threads of the multithreaded program, wherein an execution of a second one of the plurality of threads is suspended by the debugging application, and wherein the suspended second thread has exclusive access to the shared resource;
  initiating a first debug timer, wherein the first debug timer is set to expire after a reduced period of time upon determining that a previous debug timer expired during a previous execution of the current line of code;
  initiating an execution of the current line of code by operation of one or more computer processors; and
  upon determining that the first debug timer has expired before the execution of the current line of code has completed:
    resuming the execution of the suspended second thread of the multithreaded program until the second thread releases a lock on the shared resource, and
    upon detecting that the lock on the shared resource has been released, completing the execution of the current line of code.

* * * * *